United States Patent
Pedersen et al.

(10) Patent No.: US 7,577,916 B2
(45) Date of Patent: Aug. 18, 2009

(54) METHOD AND APPARATUS FOR MANAGEMENT AND REPRESENTATION OF DYNAMIC CONTEXT

(75) Inventors: Elin R. Pedersen, Redwood City, CA (US); Lester Nelson, Santa Clara, CA (US); Satoshi Ichimura, Isehara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 919 days.

(21) Appl. No.: 09/788,603

(22) Filed: Feb. 21, 2001

(65) Prior Publication Data

US 2002/0116516 A1    Aug. 22, 2002

(51) Int. Cl.
*G06F 3/048*    (2006.01)
*G06F 17/00*    (2006.01)

(52) U.S. Cl. ............... 715/767; 715/802; 715/772; 715/235

(58) Field of Classification Search .......... 346/777, 346/808, 809; 715/767, 802, 781, 777, 235
See application file for complete search history.

(56) References Cited

U.S. PATENT DOCUMENTS

| | | | | |
|---|---|---|---|---|
| 5,075,675 A | * | 12/1991 | Barker et al. | 345/794 |
| 5,471,399 A | * | 11/1995 | Tanaka et al. | 716/11 |
| 5,596,694 A | * | 1/1997 | Capps | 345/473 |
| 5,617,526 A | * | 4/1997 | Oran et al. | 715/779 |
| 5,724,025 A | * | 3/1998 | Tavori | 340/573.1 |
| 5,860,073 A | * | 1/1999 | Ferrel et al. | 715/255 |
| 5,898,432 A | * | 4/1999 | Pinard | 715/861 |
| 5,923,325 A | * | 7/1999 | Barber et al. | 345/711 |
| 6,064,387 A | * | 5/2000 | Canaday et al. | 715/839 |
| 6,271,845 B1 | * | 8/2001 | Richardson | 345/764 |
| 6,362,840 B1 | * | 3/2002 | Burg et al. | 345/835 |
| 6,462,760 B1 | * | 10/2002 | Cox et al. | 345/835 |
| 6,618,716 B1 | * | 9/2003 | Horvitz | 706/55 |
| 6,670,970 B1 | * | 12/2003 | Bonura et al. | 345/768 |

OTHER PUBLICATIONS

Benford, S.; J. Bowers, L. Fahlen, C. Greenhalgh, D. Snowden (1995) User Embodiment in Collaborative Virtual Environments. In Proc. of Chi '95 ACM Conferences on Human Factors in Computing System, ACM Press, 1995.

Bier, Eric A., Maureen C. Stone, Ken Pier, William Buxton, Tony D. DeRose (1993). Toolglass and Magic Lenses: The See-Through Inteface. In Proc. SIGGRAPH '93 Conference, ACM Press.

(Continued)

*Primary Examiner*—Ting Zhou
(74) *Attorney, Agent, or Firm*—Sughrue Mion, PLLC

(57) ABSTRACT

A technique for managing and representing dynamic context information. The system can manage local and remote activity information including sensor and computer application generated events such as calendar reminders. The technique allows users to store contextual relationship information associating an activity stream with temporary changes in the user interface that lie just outside a user's focus of attention in dynamic stylesheets. The dynamic stylesheets can be applied across work groups or companies and provide a similar contextual work environment. The dynamic stylesheets can also be customized to the specific needs of an individual. The techniques can be expanded beyond the computer desktop focus to include a user's complete work environment.

25 Claims, 9 Drawing Sheets

| Activity Stream | Representation Element | Synthesizer |
|---|---|---|
| sensor:conference_room_3a56.occupancy | desktop wallpaper | synthesizer (desktop, desktop.wallpaper, sensor:conference_room_3a56.occupancy, 0-3, sensor:conference_room_3a56.video) |
| calendar:appointment.("10/31/00").("0800") | current_text | synthesizer(current_text, current_text.style, calendar:appointment.("10/31/00").("0800"), italicize) |
| sensor:san_mateo_bridge_eastbound.speed | current_window border | synthesizer (current_window, current_window.border_color, sensor:san_mateo_bridge_eastbound.speed, 0-55, Red->Green) |
| calendar:timer | current_text | synthesizer(current_text, current_text.font.color, calendar:timer, (calendar:timer+10)-calendar:timer, Blue->Yellow->Orange->Red) |

OTHER PUBLICATIONS

Bly, S., S. Harrison, S. Irwin (1993) Media Space: Bringing People Together in a Video, Audio, and Computing Environment. In Communications of the ACM, 36(1), Jan. 1993, pp. 28-47.

Buxton, W. Integrating the Periphery and Context: A New Taxonomy of Telematics, In Proc. GI '95. Graphics Interface Conference, ACM Press, 1995.

CACM, Communication of the ACM. Special Issue on Computer Augmented Environments. Jul. 1993, 36(7).

Dourish, P. And S. Bly (1992) Portholes: Supporting Awareness in a Distributed Work Group, in Proc. CHI '92 Conf. on Human Factors in Computing Systems, ACM Press, pp. 541-547.

Fish, R., R. Kraut, R. Root (1992) Evaluating Video as Technology for Informal Communication. In Proc. of CHI '92 ACM Conference on Human Factors in Computing System, ACM Press, pp. 37-48.

Erickson, Tom, David N. Smith, Wendy A. Kellogg, Mark Laff, John T. Richards, Erin Bradner (1999) Socially Translucent Systems: Social Proxies, Persistent Conversation, and the Design of Babble. In Proc. of CHI '99 ACM Conference on Human Factors in Computing System, May 15-20, 1999 ACM Press.

Gutwin, C. and S. Greenberg (1995) Support for Group Awareness in Real-Time Desktop Conferences. In Proc. of the Second New Zealand Computer Science Research Students' Conference, Hamilton, New Zealand, 1995.

Harrison, B., H. Ishii, H., K.J. Vicente, W. Buston (1995) Transparent Layered User Interfaces: an Evaluation of a Display Design to Enhance Focused and Divided Attention. In Proc. of CHI '95. ACM Conference on Human Factors in Computing System, ACM Press, pp. 317-324.

Ishii, H., and B. Ulmer, Tangible Bits: Towards Seamless Interfaces Between People, Bits and Atoms. Proc. CHI '97, ACM Press, 1997.

Johnson, Jeff, et al., Xerox Star, a Retrospective. IEEE Computer 22:9 (Sep. 1989).

Landay, James A., Brad A. Myers (1995) Interactive Sketching for the Early Stages of User Interface Design. In Proc. 1995, ACM Press.

Norman, D.A. & S.J. Draper (1986, eds.), User-Centered System Design, Hillside, NJ: Lawrence Erlbaum Associates, Publishers, 1986.

Pedersen, E.R., and T. Sokoler (1997a): AROMA—Abstract Representation of Mediated Presence Supporting Mutual Awareness. Proc. CHI '97, ACM Press, 1997.

Pedersen, E.R., (1998); People Presence or Room Activity, Proc. CHI '98, ACM Press, 1998.

Pederson, E.R., T. Sokoler (1997b). Awareness Technology: Experiments with Abstract Representation. Proc. HCI International '97, Elsevier Publ., 1997.

Smith, I, and S.E. Hudson (1995) Low Disturbance Audio For Awareness and Privacy in Media Space Applications. In Proc. of ACM Multimedia '95, ACM Press, p. 91-97.

Strong, R., and W. Gaver (1996). Feather, Scent and Shaker: Supporting Simple Intimacy, Proc. CSCW '96, ACM Press, 1996.

W3C (1998). On Web Style Sheets. W3 consortium, http://www.w3.org/Style/.

* cited by examiner

METHOD AND APPARATUS FOR MANAGEMENT AND REPRESENTATION OF DYNAMIC CONTEXT

BACKGROUND OF THE INVENTION

1. Field of Invention

This invention relates to managing and presenting dynamic context information to a user.

2. Description of Related Art

Computer technology has provided an ability to bring ever larger informational resources to bear on solving problems. However, the methods for obtaining or absorbing this information typically require a high degree of the user's attention in order to absorb the information. Conventional systems require the user's focus of attention be completely directed to the information retrieval application. Often, however, the user's attention is distracted from absorbing the material and is instead focused on the how to retrieve the information. As a result, problem solving becomes serialized. In particular, a large amount of time and attention is directed to information retrieval instead of information analysis.

For example, video cameras of key traffic bottlenecks are regularly broadcast on television stations. However, to access this information, the user must wait for the television station to broadcast the traffic report, while all the time keeping the user's attention focused on the television. Moreover, the user must actively tune the television to the broadcasting station of interest to acquire the desired information. This process requires a shifting of the user's focus of attention from the user's primary task to the secondary task of acquiring traffic status information.

Web-based cameras and remote sensing allow users to select the desired information more quickly. However they still require specific action and direct attention on the part of the user. For example, a web browser must be opened and a specific web page or URL loaded to obtain the traffic picture information.

SUMMARY OF THE INVENTION

The psychological studies in "User Centered System Design", Norman et al. Erlbaum Associates, Hillsdale, N.J., 1986, incorporated by reference herein in its entirety, indicate opportunistic activity is increased when the user is provided with contextually related information without having to explicitly engage in information retrieval activities directed to retrieving such information.

Conventional computer application programs, such as Microsoft Word® and Microsoft Excel® and Lotus Organizer,® and conventional window-based operating systems, such as Motif, KDE, OpenLook,® and Microsoft Windows 2000®, use dialog boxes to communicate information to a user. For example, information related to one Microsoft Word® application is communicated to a user's focus of attention even when the user is concentrating on a Microsoft Excel® application. If the user clicks on the interrupted application window, the dialog box information could then be hidden behind the current application window, suspending the application corresponding to that dialog box until the dialog box is again noticed by the user. The dialog box model of interaction acquires the user's focus of attention and requires explicit action on the part of the user that interrupts the current task.

This invention provides systems and methods that provide a user with contextually relevant information through the integration of activity information from multiple applications, operating systems and sensors and that present the contextually relevant information at the periphery of the users focus of attention.

This invention separately provides systems and methods for authoring a dynamic stylesheet that defines one or more dynamic relationships between the display attributes, the representation elements and the synthesizers used to synthesize the dynamic display attributes.

In various exemplary embodiments, the systems and methods of this invention utilize a dynamic stylesheet to manage the associations between the activity information, the display attributes, the representation elements and the synthesizers to be applied to synthesize the display attributes based on activity information. Information related to the current task is then easily acquired without direct action on the part of the user.

In various exemplary embodiments, the systems and methods of this invention dynamically synthesize display attributes of application programs and/or operating system displays through application programming interfaces. When using application programs or operating systems that support stylesheets, dynamically synthesizing display attributes may be accomplished by applying stylesheets, such as XSL.

In various exemplary embodiments, the systems and methods of this invention allow the focus and periphery of the user's attention to be managed. Display attributes of representation elements are dynamically synthesized in response to activity information. The representation elements are selected based on entries contained in the dynamic stylesheet and a determination of the user's focus of attention.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
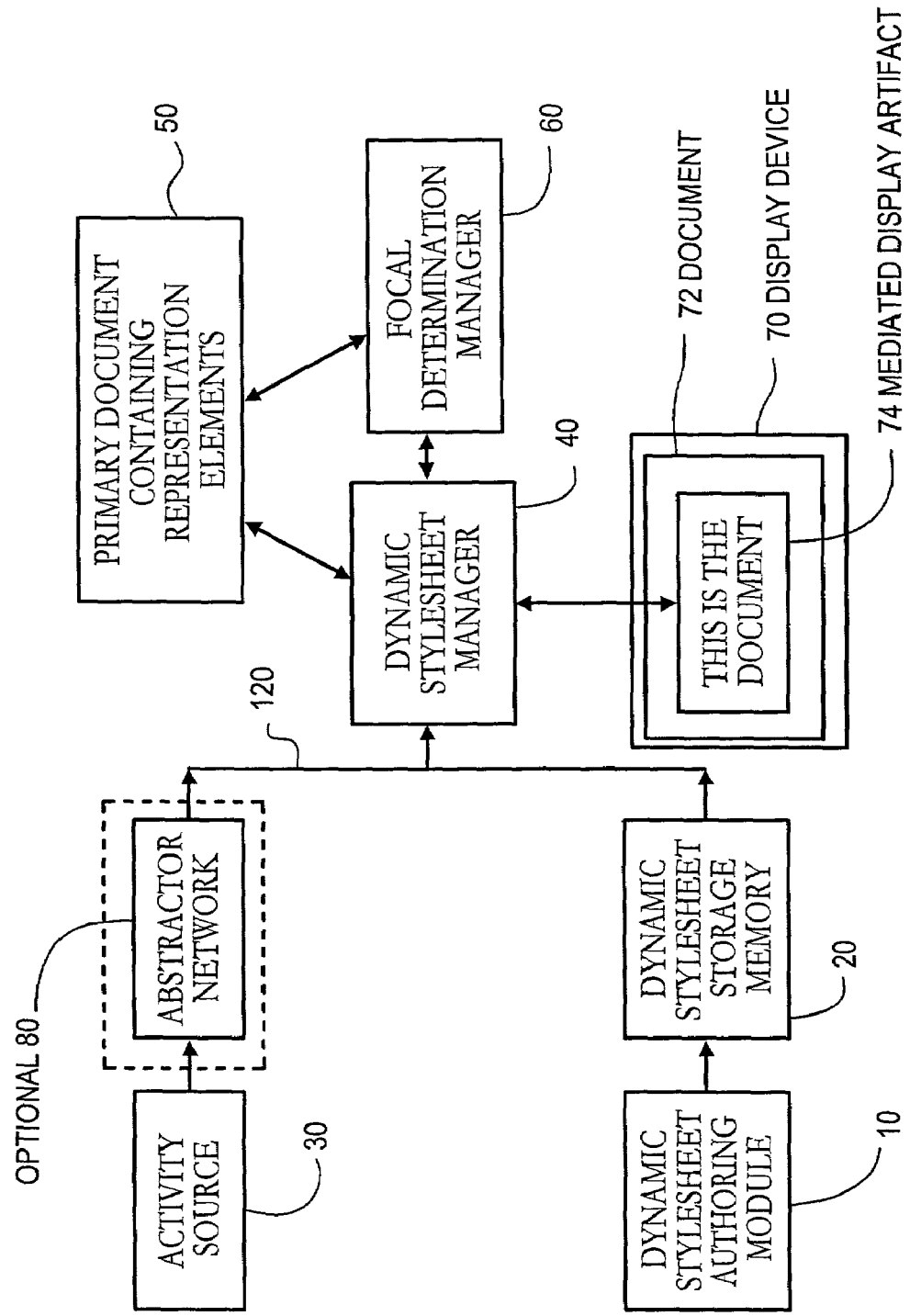
FIG. 1 is a block diagram of a first exemplary embodiment of a system for dynamically managing stylesheets according to this invention.

FIG. 1 shows a first exemplary embodiment of a system for dynamically managing stylesheets according to this invention. As shown in FIG. 1, the system for dynamically managing stylesheets includes a dynamic stylesheet authoring module 10, a dynamic stylesheet stored in a dynamic stylesheet storage memory 20, an activity stream from an activity source 30 that provides input signals to an optional abstractor network 80, a dynamic stylesheet manager 40, a primary document 50 containing representational elements, a focal determination manager 60 and a mediated display artifact 74 displayable on a display device 70. For example, the mediated display artifact 74 can be an element of a document 72 which has display attributes such as window borders, current text font, current text color or any other known or later developed display characteristic whose value can be manipulated according to the systems and methods of this invention. The mediated display artifact can be any known or later developed representation element which can be synthesized and displayed on the display device 70.

In the exemplary embodiment shown in FIG. 1, the user creates a dynamic stylesheet, which is stored in a dynamic stylesheet storage memory 20, using the dynamic stylesheet authoring module 10. In this exemplary embodiment, the dynamic stylesheet authoring module 10 is a customized editor that allows various dynamic stylesheet functions to be entered or various dynamic stylesheet tools to be accessed. However, any text editor, such as the editors, "vi" or "EMACS", or any word processor, such as Corel WordPerfect® or Microsoft Word,® can be used to implement at least a part of the dynamic stylesheet authoring module 10 used to create the dynamic stylesheet stored in the dynamic stylesheet storage memory 20.

The dynamic stylesheet authoring module 10 allows a user to create associations between activities in an activity stream provided by an activity stream source 30 and one or more of the display attributes of the representation elements. The elements of the activity stream are processed by the optional abstractor network 80. The representation elements may be representation elements in an operating system user interface and/or in a primary document 50.

For purposes of description, the various exemplary embodiment are described with respect to representational elements displayed on a computer screen. However, any known or later-developed representation elements that have modifiable attributes that are sensible by a human without the human having to direct his or her focus of attention to those representational elements can be used. Such representational elements are capable of representing information about one or more activities in the activity stream in a way that can be sensed peripherally by a user using one or more of the user's senses. For example, increased air circulation in an office may be used to provide a touch representation element at the periphery of the user's focus of attention in the user's office space. In this case, the touch representation element interacts with the user's sense of touch on the user's skin. Alternatively, for a user engaged in person-to-person conversation in an office space, the periphery of the user's focus of attention may include room elements such as a curtain. Movement of the curtain may be synthesized or controlled to represent the arrival of an anticipated guest in the building lobby. Similarly, sound, olfactory and taste representation elements may also be used. For example, a distinctive odor may be released into the air circulation of a room to convey information by olfactory sense. This may be useful for a sight or hearing impaired user. Odor and sound representation elements might also be used to more effectively convey information to sight impaired users. In short, any technique for conveying information to any user may be used in the systems and methods according to this invention. Additional techniques are disclosed in co-pending application Ser. No. 60/247,990, incorporated by reference herein in its entirety.

The display attributes of the representation elements of the exemplary embodiment may include, but are not limited to, font characteristics, window coloring, including background and foreground, current text color and desktop wallpaper. Alternatively, the dynamic stylesheet may specify new representation elements to be added to the document 72 as a new mediated display artifact 74. New representation elements may include, but are not limited to, icons placed in the system tray or on the toolbar of an application window. The dynamic-stylesheet-created representation elements may change color, shape, size and/or any other known or later-developed display attribute in correlation with some change in the activity stream as specified in an associated dynamic stylesheet stored in the dynamic stylesheet storage memory 20. Any representation element having one or more changeable display attribute characteristics can be used in the systems and methods according to this invention. Representation elements are used in their broadest sense to encompass visual, sound, touch, taste and smell elements, any one or more of which can be used in the systems and methods according to this invention.

In various exemplary embodiments, changes in the activity stream values are associated with a representation element using a dynamic stylesheet. A change in the activity stream value may include an activity stream data value exceeding a threshold value, entering a preset range or based on any detected change. Each representation element is associated with a synthesizer that determines how the state of that representation element changes based on one or more activity streams. In various exemplary embodiments discussed herein, the representation elements are shown in a one-to-one relationship with activity streams. However, it should be appreciated that, in various other exemplary embodiments, a single activity stream may be associated with multiple representation elements, and/or multiple activity streams may be associated with a single representation element.

The activity streams are provided by the activity stream source 30, which can be implemented using one or more external sensors that sense physical events or one or more computer application events, interrupts or any other known or later developed event capable of generating a signal. The activity stream may be local to the system running the dynamic stylesheet manager 40 or may be located remotely and accessed over a communication link 120. Remote activity streams may be received by any known or later-developed network or communication system.

An activity stream generated by a computer event or a sensed event is optionally abstracted by the abstractor network 80. The optional abstractor network 80, if implemented, analyzes the raw event or sensor data and provides normalized sensor or activity stream change data that can be more easily used by the dynamic stylesheet manager 40. Thus, the optional abstractor network 80 processes the raw sensor and/or activity stream change data. The output of the optional abstractor network 80 or the activity stream is then transferred to the dynamic stylesheet manager 40 over the communications link 120.

Changes in the one or more activity streams detected by the dynamic stylesheet manager 40 may include, but are not limited to, reminders of scheduled events and/or sensor values exceeding or falling below threshold values. For example, sensors may be placed in conference room seats to monitor the number of occupied seats. The multiple seat sensor values may then be abstracted to create a normalized occupancy value. For example, the activity streams for three occupied chairs in a particular conference room may reflect a percentage of total occupancy rather than the actual number of occupied seats detected. The one or more activity streams change dynamically as people enter the conference room and take their seats. As the one or more activity streams change, the changes are transmitted to the dynamic stylesheet manager 40. Display attributes of the associated representation elements are synthesized according to the entries specified in the dynamic stylesheet stored in the dynamic stylesheet storage memory 20.

The dynamic stylesheet manager 40 receives the raw or processed activity stream and a dynamic stylesheet that is stored in a dynamic stylesheet storage memory 20. The dynamic stylesheet manager 40 interacts with a focal determination manager 60 to determine a user's current focus of attention.

If the focal determination manager 60 determines the user is focused on, for example, a primary document 50, any activity stream changes defined in the dynamic stylesheet stored in the dynamic stylesheet storage memory 20 are used by the dynamic stylesheet manager 40 to dynamically synthesize display attributes for the associated representation elements of the primary document 50 by dynamically applying stylesheets to the primary document 50. The primary document 50 with the dynamically synthesized display attributes is used to create the mediated display artifact 74 within a document window 72 displaying the primary document 50 on the display device 70. The dynamic stylesheet stored in the dynamic stylesheet storage memory 20 only specifies dynamic display or informational changes to the representation elements of the primary document 50. The primary document 50 remains unaffected by the dynamic display or informational changes in the mediated display artifact 74. Thus, the dynamic display defined by the dynamic stylesheet provides contextually relevant information to the user in an unobtrusive manner by providing the information at the periphery of the user's focus of attention.

Figure 2:
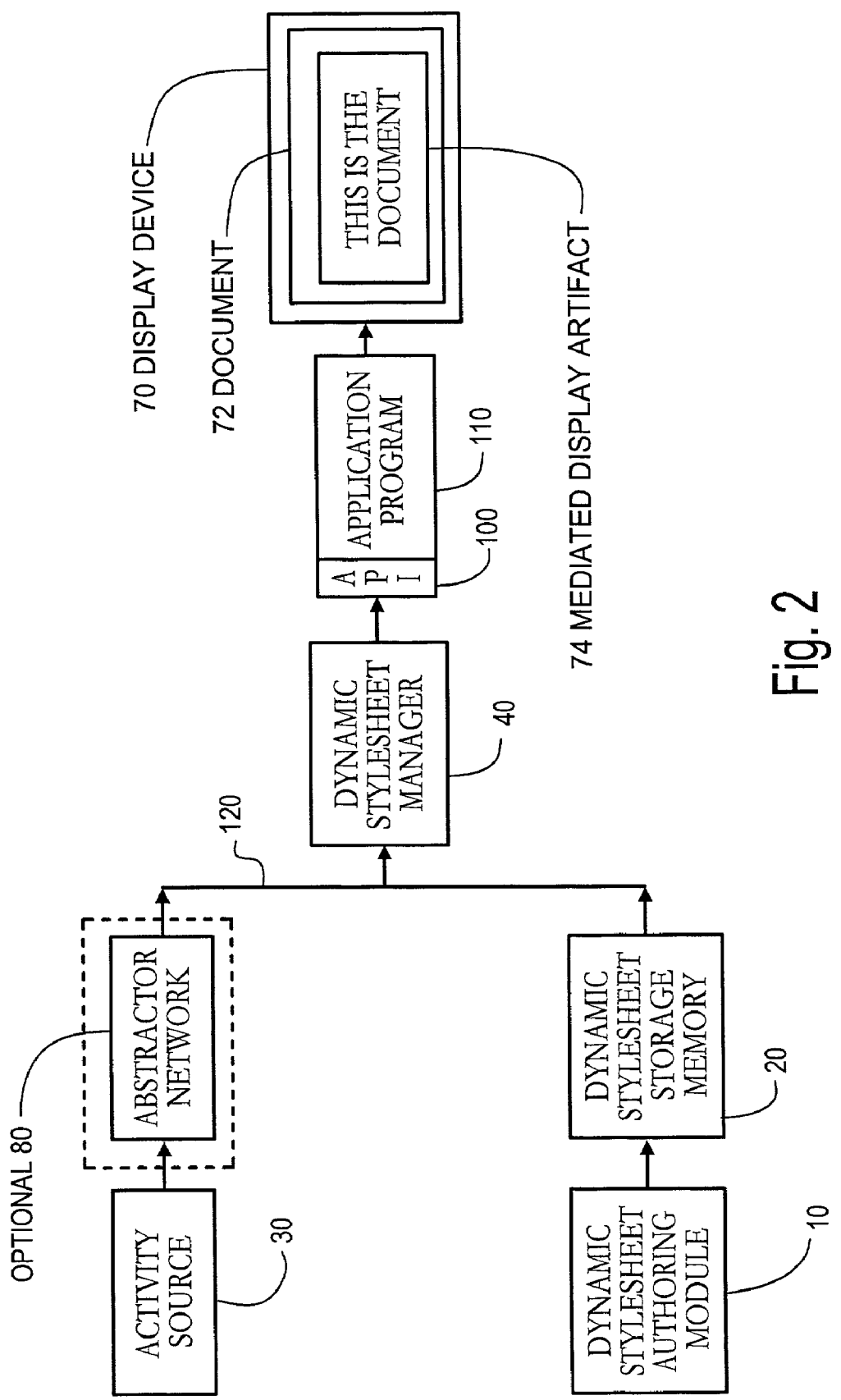
FIG. 2 is a block diagram of a second exemplary embodiment of a system for dynamically managing stylesheets according to this invention.

FIG. 2 shows a second exemplary embodiment of a system for dynamically managing stylesheets according to this invention. The application programming interface 100 provides at least one or more style-related API calls. The application programming interface 100, provides an interface between the dynamic stylesheet manager 40 and an application program 110. The dynamic stylesheet manager 40 receives one or more raw or processed activity streams, and a dynamic stylesheet from the dynamic stylesheet storage memory 20, as outlined above. The dynamic stylesheet manager 40 dynamically synthesizes one or more display attributes for the representation elements. The synthesized display attributes are based on changes in the one or more activity streams and entries in the dynamic stylesheet stored in the dynamic stylesheet storage memory 20.

The dynamic stylesheet manager 40 makes calls to the application program interface 100 of the application 110 to synthesize one or more display attributes of the representation elements. The application program interface 100 provides a programmable interface to the display capabilities of an application program. Display attribute changes may correspond to single application program interface calls or to multiple application program interface calls. However, as discussed above, the synthesized display attributes created by the synthesizer calls to the application programming interface 100 do not affect the underlying application or active application file. The synthesized display attributes are only temporary display or informational artifacts used to convey additional contextual information to a user.

Figure 3:
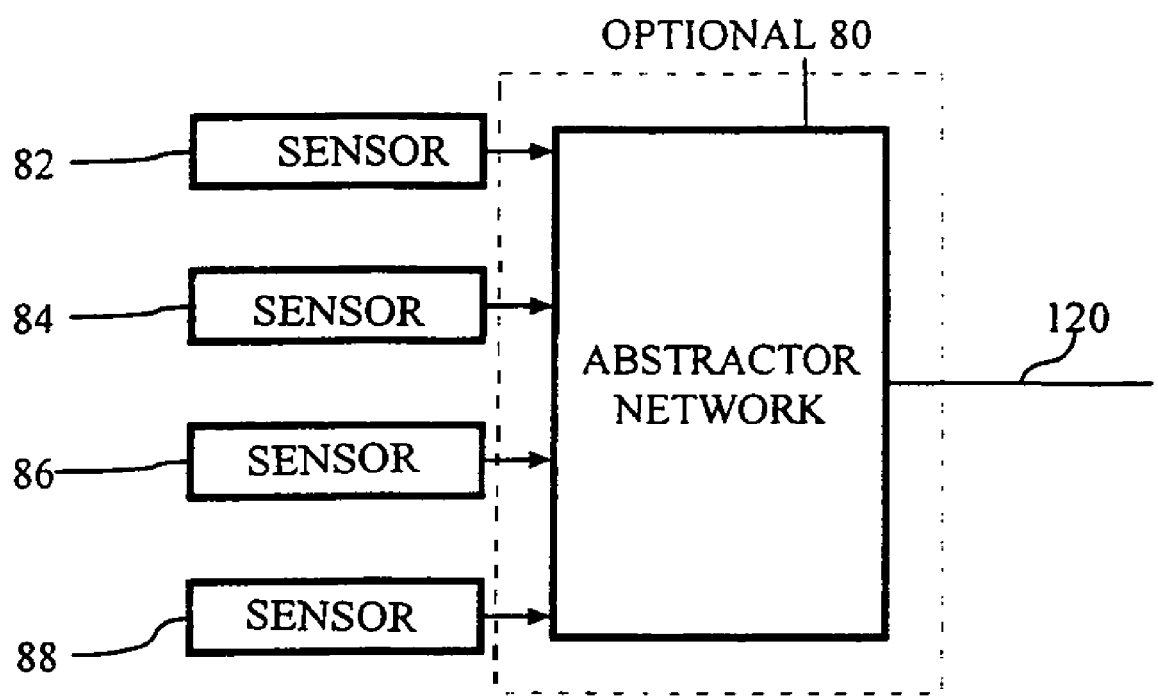
FIG. 3 is a block diagram of one exemplary embodiment of the sensor and abstractor network of FIGS. 1 and 2 according to this invention.

FIG. 3 shows one exemplary embodiment of the optional abstractor network 80 shown in FIGS. 1 and 2. In one exemplary implementation of this invention, a first sensor 82 is a San Mateo Bridge eastbound traffic sensor, while the sensors 84-88 are three conference room occupancy sensors. The sensors 82-88 are connected to the optional abstractor network 80, which processes and normalizes the sensor data. For example, the sensors 84-88 can be pressure switches placed in the seats that detect an individual's presence in a conference room. The sensor signals generated by the sensors 84-88 are used by the optional abstractor network 80 to create a normalized "conference_room.occupancy" activity stream. The optional abstractor network 80 then transfers the "conference_room.occupancy" activity stream over the communication link 120 to the dynamic stylesheet manager 40.

The sensor 82 can be a speed sensor such as a microwave radar, ultrasonic, laser and/or a count sensor such as a photoelectric, pressure switch or any type of sensor useful in identifying the speed of vehicles and/or the number of vehicles. The sensor signals generated by 82 are then used by the optional abstractor network 80 to create a normalized speed "San Mateo Bridge eastbound traffic speed" activity stream. The optional abstractor network 80 then transfers the "San Mateo Bridge eastbound traffic speed" east bound bridge speed activity stream over the communication link 120 to the dynamic stylesheet manager 40.

Figure 4:
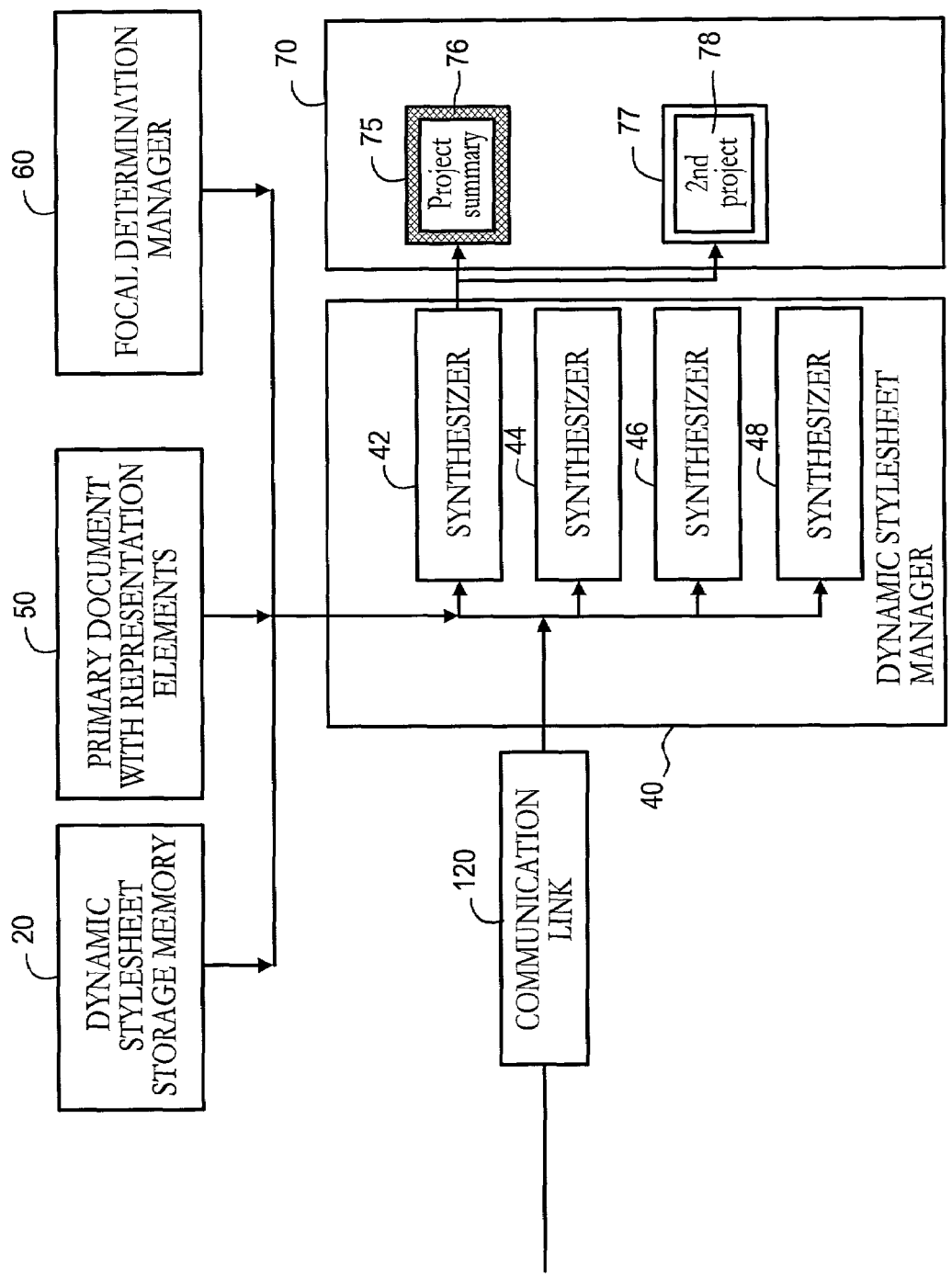
FIG. 4 is a block diagram of a first exemplary embodiment of the dynamic stylesheet manager of FIGS. 1 and 2 according to this invention.

FIG. 4 is a block diagram of a first exemplary embodiment of the dynamic stylesheet manager 40 shown in FIGS. 1 and 2 according to this invention. As shown in FIG. 4, the dynamic stylesheet manager 40 includes a number of synthesizers 42, 44, 46 and 48, and is connected to a number of windows 75 and 77 displayed on the display device 70. The window 75 has a window border representation element 76. The window 77 has a font color representation element 78.

The dynamic stylesheet manager 40 receives one or more activity streams through the optional abstractor network 80 over the communication link 120. In this exemplary embodiment, the dynamic stylesheet manager 40 receives the one or more activity streams, as well as representation element and synthesizer information encoded in one or more dynamic stylesheets stored in the dynamic stylesheet storage memory 20. The dynamic stylesheet manager 40 dynamically synthesizes a display attribute for each of the representation elements specified in one or more of the one or more dynamic stylesheets stored in the dynamic stylesheet storage memory 20.

In this exemplary embodiment, the display attribute for each representation element is dynamically synthesized as each activity stream changes. This reflects a push model of activity stream data, in which the abstracted activity stream data is pushed to the dynamic stylesheet manager 40 from the activity stream source 30. It should be appreciated that various other exemplary embodiments may employ a pull model in which the dynamic stylesheet manager 40 pulls activity stream data from the activity stream source 30 at scheduled times. The dynamic stylesheet manager 40 then synthesizes changes based on activity stream data as specified in the dynamic stylesheet stored in the dynamic stylesheet storage memory 20. It should be appreciated that any known or later-developed model of information transfer that permits the dynamic stylesheet manager 40 to respond to changes in activity stream data may be employed without departing from the spirit and scope of this invention.

It should also be appreciated that different stylesheets can be used to synthesize display attributes depending on the application or task to be performed. Multiple stylesheets may be applied to the same document or user interface. For example, a project summary document may be associated with a dynamic stylesheet stored in the dynamic stylesheet storage memory 20 that synthesizes a border 76 around the project summary document window 75. The state of the border 76 can be used to indicate whether a conference on a related aspect of the project is taking place in a conference room. Alternatively, the font color 78 of a second project document 77 may change its state to indicate whether a sub-project has been completed, the completion of which is required before the project summary can be finalized.

Figure 5:
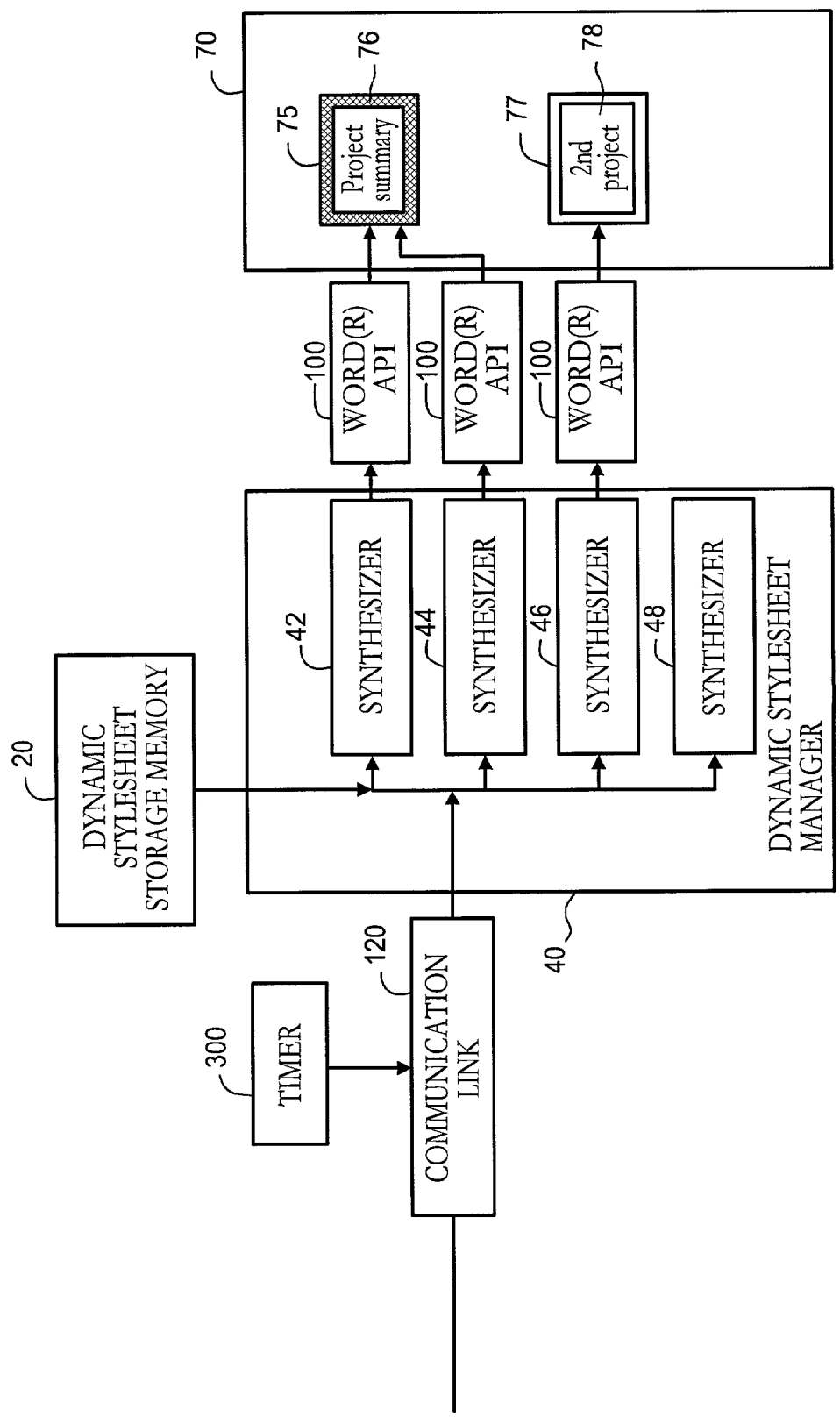
FIG. 5 is a block diagram of a second exemplary embodiment of the dynamic stylesheet manager of FIGS. 1 and 2 according to this invention.

FIG. 5 is a block diagram of a second exemplary embodiment of the dynamic stylesheet manager of FIGS. 1 and 2 according to this invention. The dynamic stylesheet manager 40 accepts one or more dynamic stylesheets stored in the dynamic stylesheet storage memory 20 and one or more activity streams, through the optional abstractor network 80 over the communication link 120. Each of the one or more dynamic stylesheets stored in the dynamic stylesheet storage memory 20 defines relationships associating one or more activity streams with representation elements and synthesizers. The activity streams are transferred over the communication system 120 to the dynamic stylesheet manager 40. The dynamic stylesheet manager 40 calls one or more of a number of synthesizers 42, 44, 46 and 48 to synthesize a display attribute for the representation elements based on the entries stored within the dynamic stylesheet stored in the dynamic stylesheet storage memory 20. Each of the synthesizers 42, 44, 46 and 48 synthesizes a display attribute for one or more of the representation elements, the synthesizers 42, 44, 46 and 48 synthesizes a display attribute for a project summary document window 75. In particular, the window border 76 is dynamically synthesized by the synthesizer 42 by making an application programming interface call to a first Word® application programming interface 100 to a Microsoft Word® application to synthesize this display attribute.

The synthesizer 46 is associated with the activity stream for a timer 300. The synthesizer 46 calls a second Microsoft Word® application programming interface 100 to synthesize the state of one or more display attributes of the current text in the second window 77. As the timer 300 countdown proceeds through the specified range, the state of these one or more attributes of the current text are dynamically synthesized to reflect the activity stream values. For example, the font color 78 may change state to indicate whether the sub-project has been completed.

The synthesizer 48 is associated with the occurrence of a calendar event. The synthesizer 48 calls the Microsoft Word® application programming interface 100 to synthesize the state of one or more display attributes of the current text in the first window 75, such as the text format. As the time of the calendar appointment nears the present time, the state of the current text font 79 is dynamically synthesized to reflect the activity stream values.

Figure 6:
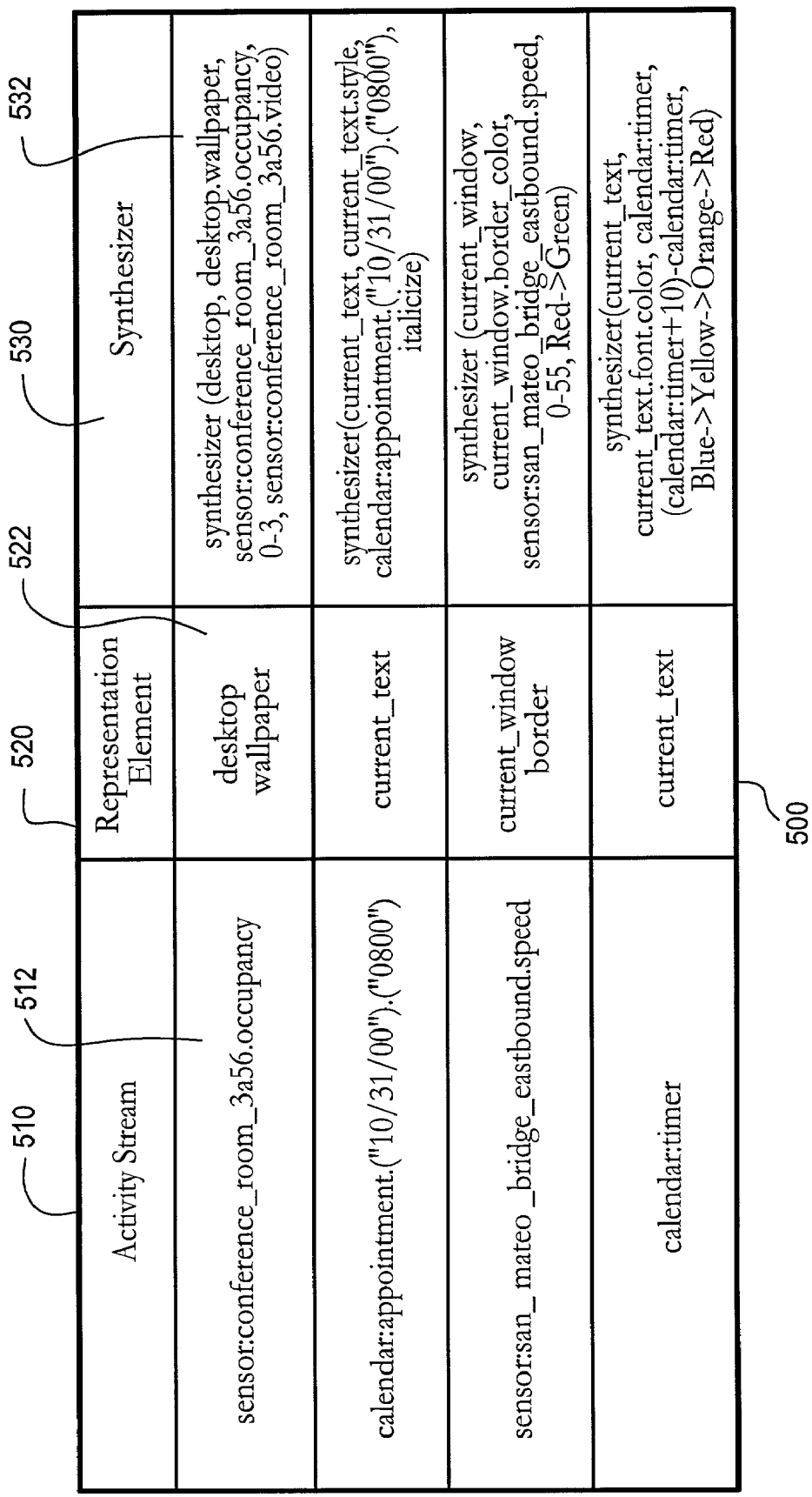
FIG. 6 is an exemplary embodiment of a dynamic stylesheet according to this invention.

FIG. 6 shows an exemplary embodiment of a dynamic stylesheet 500 stored in the dynamic stylesheet storage memory 20. The dynamic stylesheet 500 includes an activity stream portion 510, a representation element portion 520 and a synthesizer portion 530. The synthesizer portion 530 defines relationships between the selected activity streams 512 in the activity stream portion 510 and the associated representation elements 522 in the representation element portion 520. The table shows each activity stream 512 and each representation element 522 in a one-to-one relationship. However, it should be appreciated that multiple activity streams 512 may be associated with each representation element 522 and that multiple representation elements 522 may be associated with a single activity stream 512.

The synthesizer portion 530 in the dynamic stylesheet 500 defines associations between various ones of the representation elements 522 and various ones of the associated synthesizers 532 affecting the display attributes of the respective representation elements. The first row of exemplary stylesheet 500 shows the "sensor:conference_room_3A56.occupancy" activity stream 512 associated with the desktop wallpaper representation element 522 and a synthesizer 532 that synthesizes a video of the conference room for the desktop wallpaper as the number of occupied seats in the conference room approaches capacity. As people enter the conference room and take seats, the "sensor:conference_room_3a56.occupancy" activity stream 512 changes state. The dynamic stylesheet manager 40 receives notification of the change in occupancy value over the communication system. The dynamic stylesheet manager 40 dynamically synthesizes a display attribute for the associated representation element, 522, i.e., the desktop wallpaper. The associated synthesizer 532 provides for fading the wallpaper into a video of the conference room as the sensor:conference_room_3a56.occupancy activity stream changes state.

The second row shows a computer calendar appointment event 512 in the activity stream portion 510. The calendar appointment is associated with the representation element 522 for the current text and a synthesizer 532 from the synthesizer portion 530. When the dynamic stylesheet manager 40 detects the appointment date and time has occurred, an italicized current text display attribute is synthesized to unobtrusively indicate the appointment information to the user at the periphery of the user's focus of attention.

The third row shows the "San Mateo Bridge eastbound traffic speed" sensor activity stream 512 of the activity stream portion 510 associated with the current window border representation element 522 of the representation element portion 520. The "San Mateo Bridge eastbound traffic speed" sensor activity stream 512 and the current border window 522 are associated with a synthesizer 532 from synthesizer portion 530. When the dynamic stylesheet manager 40 detects the relevant changes in the "San Mateo Bridge eastbound traffic speed sensor" activity stream 512, the state of the current window border 522 is dynamically synthesized. The dynamic synthesis of the current window border state unobtrusively communicates to the user how well traffic is moving over the San Mateo bridge, so that the user can decide whether to start the commute home across the San Mateo bridge.

The fourth row shows the calendar timer activity stream 512 in the activity stream portion 510. The calendar timer activity stream 512 is associated with the current text 522 in the representation element portion 520 and a synthesizer 532 from the synthesizer portion 530. When the dynamic stylesheet manager 40 detects a change in the calendar timer activity stream 512, the dynamic stylesheet manager 40 dynamically synthesizes a change in the state of the current text font color to unobtrusively indicate to the user the state of the calendar timer.

In various exemplary embodiments, associations between activity streams, representation elements and synthesizers are stored in the dynamic stylesheet storage memory 20 using a table format. However, it should be appreciated that any encoding of the information is possible without departing form the spirit or scope of this invention. For example, the dynamic stylesheet stored in the dynamic stylesheet storage memory 20 may be encoded in HTML using application specific tags. Alternatively, the dynamic stylesheet stored in the dynamic stylesheet storage memory 20 may be encoded using XML or any known or later developed encoding of the information that allows for decoding of the information by the dynamic stylesheet manager 40.

Figure 7:
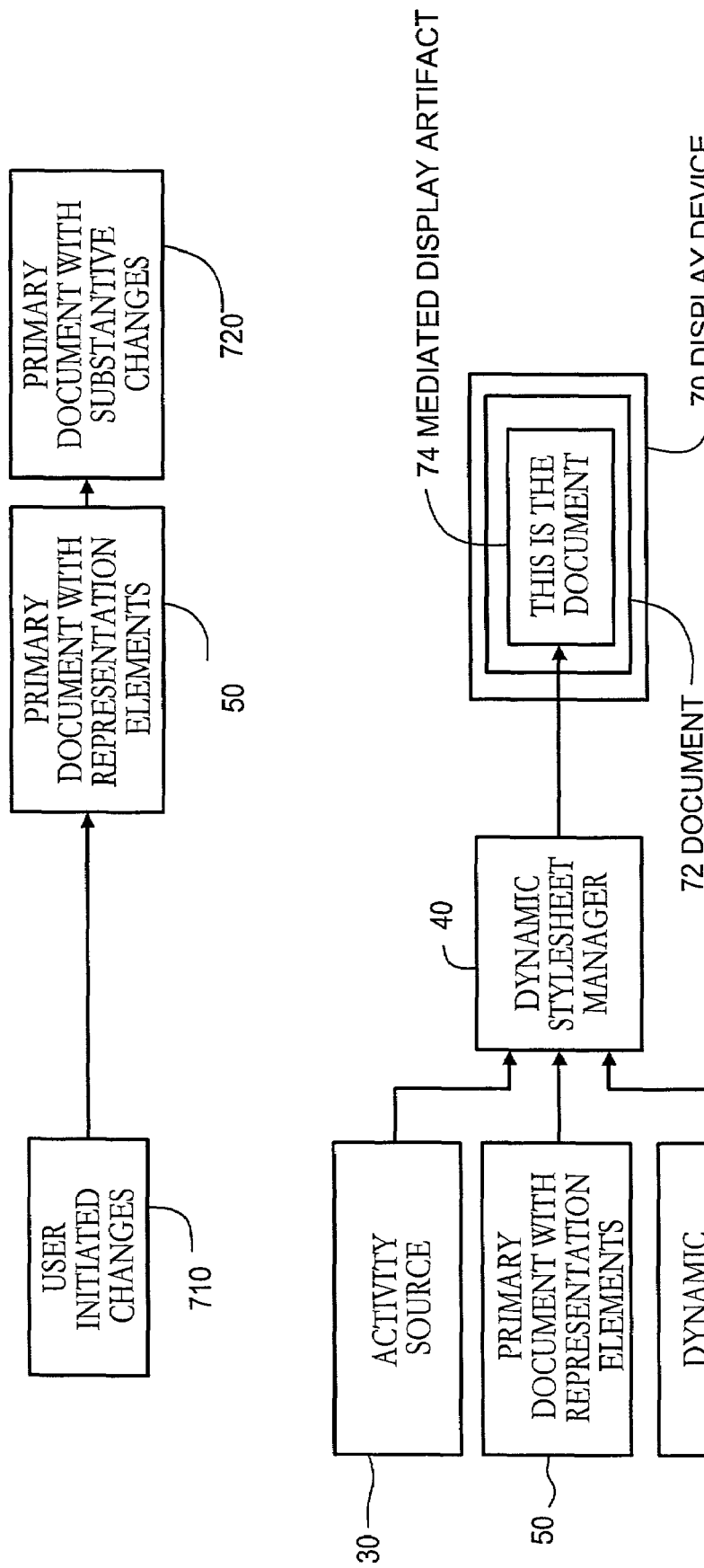
FIG. 7 illustrates user-initiated and dynamic stylesheet-initiated changes to a document and to a mediated display artifact according to this invention.

FIG. 7 shows how user-initiated changes 710 are applied to the primary document 50 with representation elements to create a primary document with substantive changes 720. These changes reflect substantive changes made by the user to update and or change a document.

In contrast, activity stream from the activity source 30 is used by the dynamic stylesheet manager 40 with a dynamic stylesheet stored in the dynamic stylesheet storage memory 20 and the primary document 50 with representation elements to create a mediated display artifact 74. The display attributes of the representation elements of a mediated display artifact 74 of a document 72 displayed on a display device 70 are synthesized display attributes based on the activity stream 30. However, the synthesized display attributes do not reflect substantive changes to the primary document.

Figure 8:
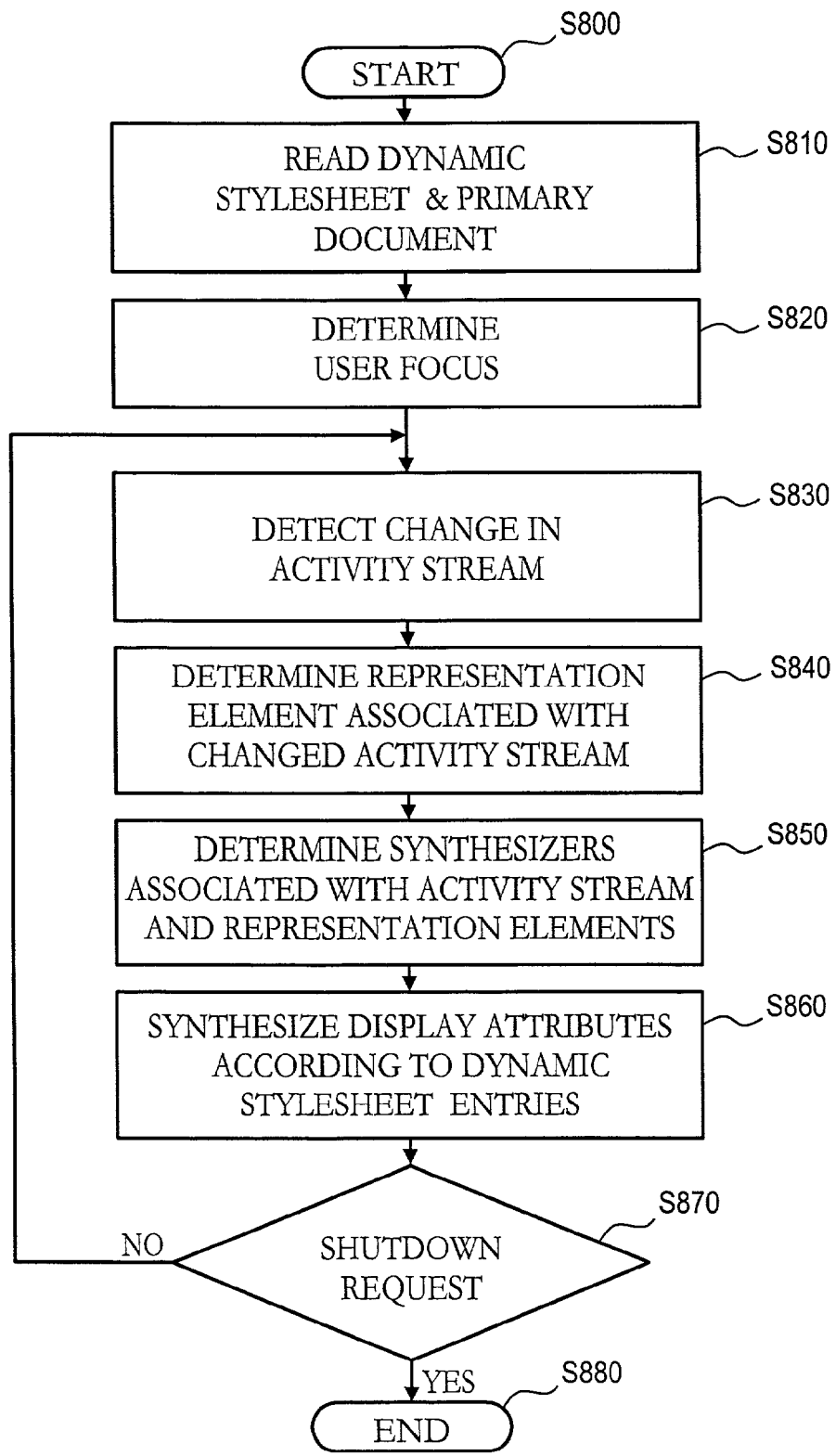
FIG. 8 is a flowchart outlining one exemplary embodiment of a method for dynamically managing stylesheets according to this invention.

FIG. 8 is a flowchart outlining one exemplary embodiment of a method of dynamically managing stylesheets according to this invention. Beginning at step S800, control continues to step S810, where the dynamic stylesheet and the primary document are read. The primary document contains representation elements for which display attributes will be synthesized. In various other exemplary embodiments, the dynamic stylesheet can be applied to an entire user interface including each of the display windows and the operating system desktop.

Next, in step S820, after reading the dynamic stylesheet and the primary document, the focus of the user's attention is determined. If the user's attention is determined to be focused on the primary document, the primary document is selected as the target for synthesis of display attributes of representation elements. If the user's attention is determined to be focused on a second window or on the desktop, representation elements that are determined to be at the periphery of the user's focus of attention relative to that second window or the desktop are selected. For example, the user's recent placement of the mouse within a window might be used to determine that the focus of attention is the document within the selected window. Alternatively, computer tracking of head attitude or eye positioning or any other known or later developed techniques for determining a focus of the user's attention may be used without departing from the spirit or scope of this invention.

Then, in step S830, once the user's focus of attention is determined, changes in one or more activity streams are detected. The detection of these changes may be accomplished with a push model in which changed data is sent or pushed from the activity stream source. Alternatively, the changes may be pulled from the one or more activity streams by polling the one or more activity streams at specified intervals. In either the pull or push model, the changes detected between the current and previous activity stream values are identified. Control then continues to step S840.

In step S840, a representation element associated with the changed activity stream data is determined. The representation element may be determined from the dynamic stylesheet, or from a data structure into which the dynamic stylesheet has been read. Then, in step S850, after determining the representation elements associated with the activity stream, the specific synthesizers associated with the changed activity streams are determined. Next, in step S860, the display attributes associated with the determined synthesizers are synthesized based on the information encoded in the dynamic stylesheet. For example, window border colors may be dynamically synthesized according to determined values of the activity streams. Control then continues to step S870.

In step S870, a determination is made whether a request has been received to shutdown the dynamic stylesheet manager.

If no request to shut down the system is received control jumps back to step S830, where new changes in the activity stream are detected. In contrast, once a request to shut down the system is received, control continues to step S880 where the process ends.

Figure 9:
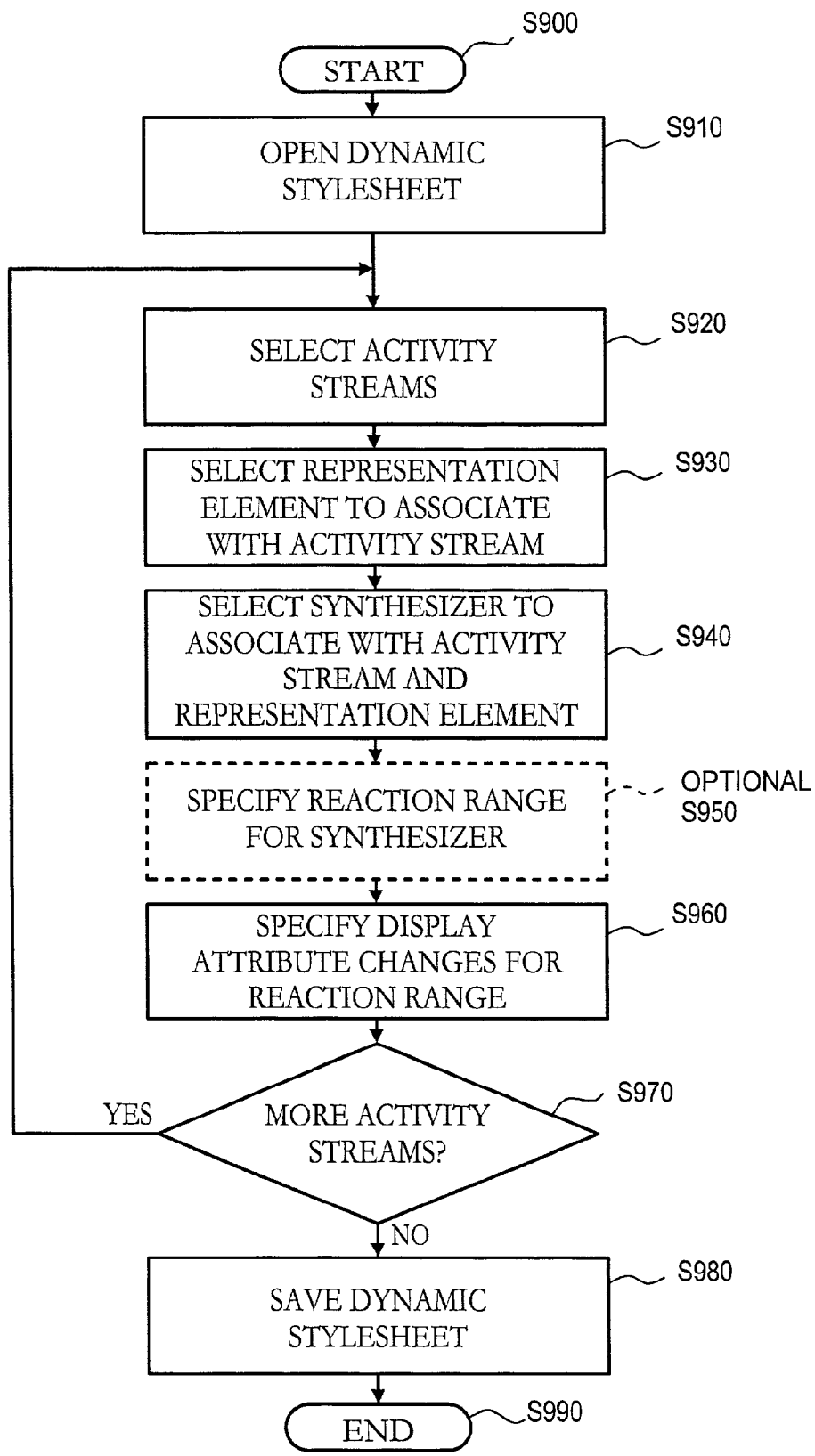
FIG. 9 is a flowchart outlining one exemplary embodiment of a method of authoring a dynamic stylesheet according to this invention.

FIG. 9 is a flowchart outlining one exemplary embodiment of a method of dynamic stylesheet authoring according to this invention. As shown in FIG. 9, beginning in step S900, control continues to step S910 where a dynamic stylesheet is opened or created. Then, in step S920 one or more activity streams from one of the activity stream sources is selected. In the exemplary embodiment, each activity stream may be selected using a drop down dialog box bound or filled with all the activity streams available in the system. However, any technique for selecting an activity stream may be used, including typing the name of the stream directly into a dialog box. Next, in step S930, one or more selected representation elements are associated with one or more previously selected activity streams. The one or more representation elements are selected using a drop down dialog box of commonly selected elements. However, any technique for selecting one or more representation elements to be associated with the selected one or more activity streams may be used, including, but not limited to, drag-and-drop text entry and direct text entry into a dialog box. Control then continues to step S940.

In step S940, one or more synthesizers are selected to be associated with the one or more previously selected activity streams and the one or more previously selected representation elements. Each of the one or more synthesizers may be selected from any of a number of predefined synthesizers. Alternatively, a third party or user-developed synthesizer may be selected to synthesize a new display attribute for a selected representation element. Next, in step S950, a reaction range for the synthesizer is optionally selected. If specified, the selected synthesizer will synthesize the selected display attributes based the activity stream values.

In step S960, the synthesized display attribute changes associated with the activity stream or the optional reaction range can be specified for the synthesizer. For example, a selected synthesizer may support font color changes, font italicization, window border color synthesis or any other change to a display attribute. Next, in step S970, a determination is made whether additional activity streams are to be processed. If more activity streams are to be processed, control jumps back to step S920 and the steps S920 through S970 are repeated until no further activity streams remain to be processed. When the determination made in step S970 indicates that no further activity streams remain to be processed, control continues to step S980, where the authored dynamic stylesheet is saved. Then in step S990, the dynamic stylesheet authoring process ends.

As shown in FIGS. 1, 2 the systems and methods for managing and representing dynamic context according to this invention are preferably implemented on a programmed general purpose computer. However, the systems and methods for managing and representing dynamic context according to this invention can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 8 and 9 can be used to implement the systems and methods for managing and representing dynamic context according to this invention.

Various ones of the blocks shown in FIGS. 1-5 can be implemented as portions of a suitably programmed general purpose computer. Alternatively, various ones of the blocks shown in FIGS. 1-5 can be implemented as physically distinct hardware circuits within an ASIC, or using a FPGA, a PDL, a PLA or a PAL, or using discrete logic elements or discrete circuit elements. The particular form each of the blocks shown in FIGS. 1-5 will take is a design choice and will be obvious and predicable to those skilled in the art.

As shown in FIGS. 1, 2, 4, 5 and 7, the dynamic stylesheet storage memory 20 can be implemented using any appropriate combination of alterable, volatile or nonvolatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication link 120 of FIGS. 1-5 can be any known or later developed device or system for connecting the activity streams from the activity sources 30, the optional abstractor network 80, the dynamic stylesheet authoring module 10, the one or more dynamic stylesheets stored in the dynamic stylesheet storage memory 20, and the dynamic stylesheet manager 40, including one or more of a direct cable connection, a connection over a wide area network or a local area network, a connection over an intranet, a connection over the Internet, or a connection over any other distributed processing network or system. In general, the communication link 120 can be any known or later developed connection system or structure usable to connect the activity streams from activity stream source 30, the optional abstractor network 80, the dynamic stylesheet authoring module 10, the one or more dynamic stylesheets stored in the dynamic stylesheet storage memory 20 and the dynamic stylesheet manager 40.

Further, it should be appreciated that the communication link 120 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented method for managing dynamic context comprising:
storing associations between an activity stream and a representation element, the activity stream based on an activity beyond a perception of a user;
synthesizing a human sensible attribute of the representation element responsive to changes in the activity stream and the stored associations;
determining a focus of attention of the user;
presenting the synthesized attribute of the representation element to the user at a periphery of the focus of attention, the periphery of the focus of attention being separated by a distance from the focus of attention of the user; and
dynamically changing the human sensible attribute of the representation element responsive to dynamic changes in the activity stream,
wherein varying portions of a graphical user interface associated with the representation element are being used in informing the user of the changes in the activity stream, and
wherein the dynamically changing the human sensible attribute is gradually increasing an intensity of the human sensible attribute, as a function of time and without user interaction, and as a means of notifying the user of the changes in the activity stream.

2. The method of claim 1, wherein the activity stream is information including external sensor information.

3. The method of claim 1, wherein the human-sensible attribute is synthesized based on a selected range.

4. The method of claim 1, wherein the human-sensible attribute is synthesized based on values outside a selected range.

5. The method of claim 1, wherein the activity stream has a value outside a predicted range of values.

6. The method of claim 5, further comprising determining the predicted range of values based on monitoring activity stream.

7. The method of claim 1, wherein the human-sensible attribute is a display attribute.

8. The method of claim 7, wherein the display attribute includes at least one of a text characteristic, a window characteristic, a desktop characteristic.

9. The method of claim 1, wherein the activity is at least one of a scheduled event approaching and sensor values changing.

10. The method of claim 1, wherein the activity stream comprises information including at least one of external sensor information, telephone information, broadcast news information, and pager information.

11. A system for managing dynamic context, comprising:
a synthesizer circuit, each synthesizer circuit synthesizing a human-sensible attribute of a representation element based on changes in an activity stream, the activity stream based on an activity that is beyond a user's perception;
a memory that stores associations between the activity stream, the representation element and the synthesizer circuit;
a user focus of attention determining circuit that determines the user's focus of attention; and
a user interface operable to present the synthesized human sensible attribute to the user using the representation element and operable to dynamically change the human sensible attribute of the representation element responsive to dynamic changes in the activity stream;
wherein varying portions of the user interface in a periphery of the user's focus of attention are being used to inform the user of the changes in the activity stream, the periphery of the user's focus of attention being separated by a distance from the focus of attention of the user, and
wherein the dynamically changing the human sensible attribute is gradually increasing an intensity of the human sensible attribute as a function of time and without user interaction, and as a means of notifying the user of the change in the activity stream.

12. The system of claim 11, wherein the activity stream is an input signal including an external sensor signal.

13. The system of claim 11, wherein the synthesizer circuit synthesizes the human-sensible attributes based on a selected range.

14. The system of claim 11, wherein the synthesizer circuit synthesizes the human-sensible attributes based on activity stream values outside a selected range.

15. The system of claim 11, wherein the representation element and the activity stream are dynamically associated based on whether the activity stream has a value outside a predicted range of values.

16. The system of claim 15, wherein the predicted range of values is determined by monitoring activity stream.

17. The system of claim 11, wherein the human-sensible attribute is a display attribute.

18. The system of claim 17, wherein the display attribute includes at least one of a text characteristic, a window characteristic, and a desktop characteristic.

19. The method of claim 1, wherein determining a user's focus of attention comprises determining a users focus of attention by actively sensing the user's focus of attention.

20. The system of claim 11, wherein the activity is at least one of a scheduled event approaching and sensor values changing.

21. The system of claim 11, wherein the activity stream comprises information including at least one of external sensor information, telephone information, broadcast news information, and pager information.

22. A computer-implemented method for dynamically managing a focus and a periphery of attention of a user of a primary document on a display, the method comprising:
determining a focus of attention of the user;
detecting a change in an activity stream, the activity stream occurring outside of perception of the user;
determining a representation element associated with the activity stream, the representation element having human sensible attributes; and
dynamically changing the human sensible attributes responsive to the dynamic change in the activity stream,
wherein the changing of the human sensible attributes is adapted to be sensed by the user in the periphery of the attention of the user, the periphery of the focus of attention being separated by a distance from the focus of attention of the user, and
wherein dynamically changing the human sensible attributes is gradually increasing intensity of the human sensible attributes, as a function of time and without user interaction, and as a means of notifying the user of the changes in the activity stream.

23. The method of claim 22, wherein the human sensible attributes are selected from vision, sound, touch, taste and smell.

24. The method of claim 22, wherein the changing the human sensible attributes includes applying a dynamic stylesheet to the representation element.

25. The method of claim 24, further comprising:
authoring the dynamic stylesheet including:
obtaining a selected activity stream from among a plurality of activity streams; and
specifying variations to the human sensible attributes of the representation element responsive to changes in the selected activity stream,
wherein the variations in the human sensible attributes indicate, unobtrusively to the user, the changes in the selected activity.

* * * * *